United States Patent
Shirakami et al.

(10) Patent No.: US 10,538,273 B2
(45) Date of Patent: Jan. 21, 2020

(54) VEHICLE FRONT PORTION STRUCTURE

(71) Applicant: NIPPON STEEL & SUMITOMO METAL CORPORATION, Tokyo (JP)

(72) Inventors: Satoshi Shirakami, Tokyo (JP); Kenichiro Otsuka, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/068,960

(22) PCT Filed: Jan. 27, 2017

(86) PCT No.: PCT/JP2017/002920
§ 371 (c)(1),
(2) Date: Jul. 10, 2018

(87) PCT Pub. No.: WO2017/135163
PCT Pub. Date: Aug. 10, 2017

(65) Prior Publication Data
US 2019/0009829 A1 Jan. 10, 2019

(30) Foreign Application Priority Data
Feb. 5, 2016 (JP) .................. 2016-020452

(51) Int. Cl.
*B62D 25/08* (2006.01)
*B62D 25/20* (2006.01)
(Continued)

(52) U.S. Cl.
CPC ............. *B62D 25/08* (2013.01); *B62D 21/15* (2013.01); *B62D 25/14* (2013.01); *B62D 25/20* (2013.01);
(Continued)

(58) Field of Classification Search
CPC ................ B62D 25/14; B62D 25/2018; B62D 25/2045; B62D 25/08
(Continued)

(56) References Cited

U.S. PATENT DOCUMENTS 5,125,715 A 6/1992 Kijima
6,830,289 B2 * 12/2004 Miyabayashi ....... B62D 25/082
296/193.07
(Continued)

FOREIGN PATENT DOCUMENTS

CN 203753237 U 8/2014
CN 204472911 U 7/2015
(Continued)

OTHER PUBLICATIONS

Machine Translation of DE-102006053014-A1, printed from the EPO website, Aug. 1, 2019.*
(Continued)

*Primary Examiner* — Jason S Morrow
(74) *Attorney, Agent, or Firm* — Birch, Stewart, Kolasch & Birch, LLP

(57) ABSTRACT

A vehicle front portion structure includes: a framework member in a gutter shape provided in a vehicle length direction from a front box to a cabin and having a side wall; and a dash lower panel that includes a gutter section having a side wall and fitted into an inside of the framework member and in which the side wall of the gutter section and the side wall of the framework member are joined together.

9 Claims, 15 Drawing Sheets

(51) Int. Cl.
*B62D 21/15* (2006.01)
*B62D 25/14* (2006.01)

(52) U.S. Cl.
CPC ..... *B62D 25/2018* (2013.01); *B62D 25/2045* (2013.01)

(58) Field of Classification Search
USPC .............................................. 296/187.08, 70
See application file for complete search history.

(56) References Cited

U.S. PATENT DOCUMENTS

| | | | |
|---|---|---|---|
| 2004/0155488 A1* | 8/2004 | Saito ................... | B62D 25/082 296/204 |
| 2012/0001456 A1 | 1/2012 | Naoi | |
| 2012/0074731 A1* | 3/2012 | Yoshida ............... | B62D 25/082 296/193.05 |
| 2013/0200653 A1* | 8/2013 | Yasui .................... | B62D 21/11 296/187.08 |
| 2015/0145284 A1* | 5/2015 | Nishida .............. | B62D 25/2036 296/187.1 |
| 2016/0129942 A1* | 5/2016 | Kim ................... | B62D 25/2018 296/187.08 |
| 2019/0009828 A1* | 1/2019 | Nakazawa ............. | B62D 21/02 |

FOREIGN PATENT DOCUMENTS

| | | | | |
|---|---|---|---|---|
| DE | 102006053014 A1 * | 5/2008 | ......... | B62D 25/2018 |
| EP | 2193979 A1 | 6/2010 | | |
| EP | 2620352 B1 | 4/2015 | | |
| JP | 1-170078 U | 11/1989 | | |
| JP | 3-53381 U | 5/1991 | | |
| JP | 2007-83868 A | 4/2007 | | |
| JP | 2012-11959 A | 1/2012 | | |
| JP | 2012-206590 A | 10/2012 | | |
| JP | 2013-10424 A | 1/2013 | | |

OTHER PUBLICATIONS

Extended European Search Report for corresponding European Application No. 17747320.4, dated Feb. 20, 2019.
Office Action and Search Report for counterpart Brazilian Application No. 112018013915-7, dated Mar. 8, 2019, with English translation.
Chinese Office Action and Search Report, dated Dec. 28, 2018, for corresponding Chinese Application No. 201780007811.6, with an English translation.
Korean Office Action, dated Dec. 5, 2018, for corresponding Korean Application No. 10-2018-7022097, with an English translation.
Decision to Grant a Patent for JP 2017-514933 dated Apr. 11, 2017.
International Search Report for PCT/JP2017/002920 dated Mar. 7, 2017.
Written Opinion of the International Searching Authority for PCT/JP2017/002920 (PCT/ISA/237) dated Mar. 7, 2017.
English Translation of the Written Opinion of the International Searching Authority (Form PCT/ISA/237), dated Mar. 7, 2017, for International Application No. PCT/JP2017/002920.

* cited by examiner

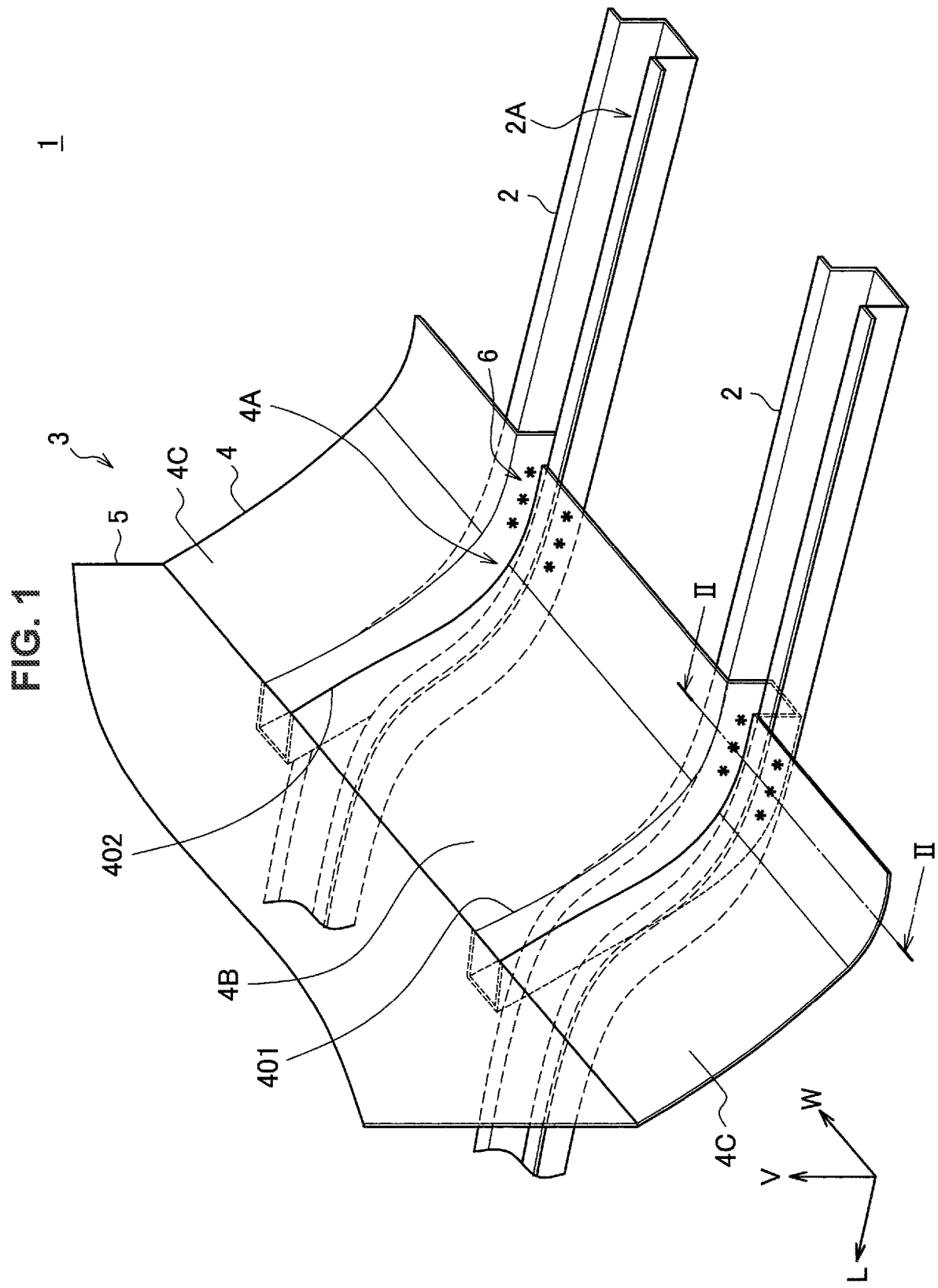

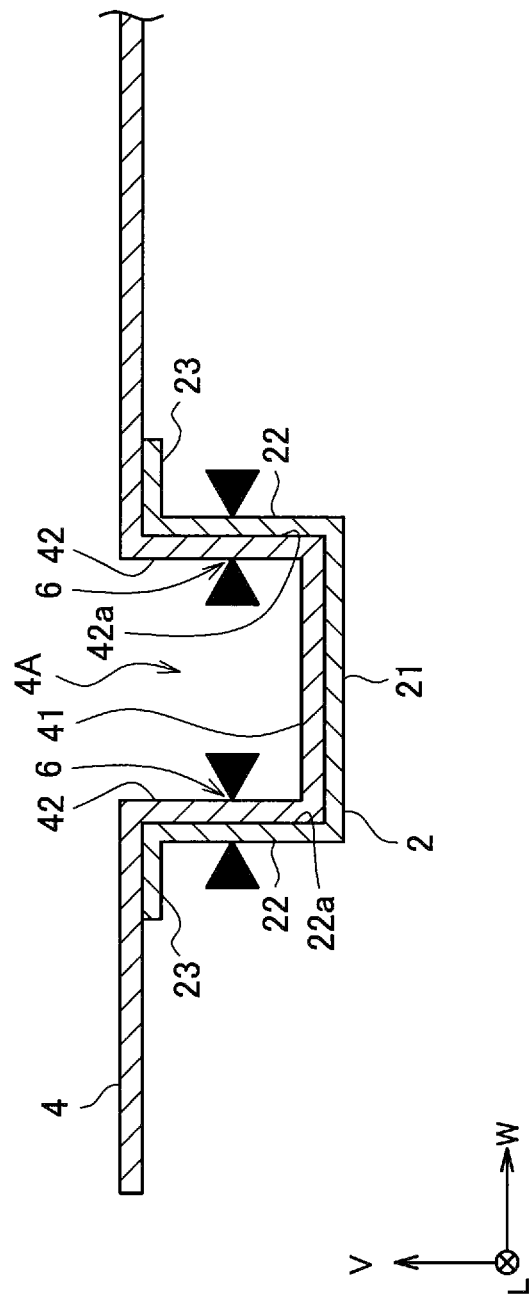

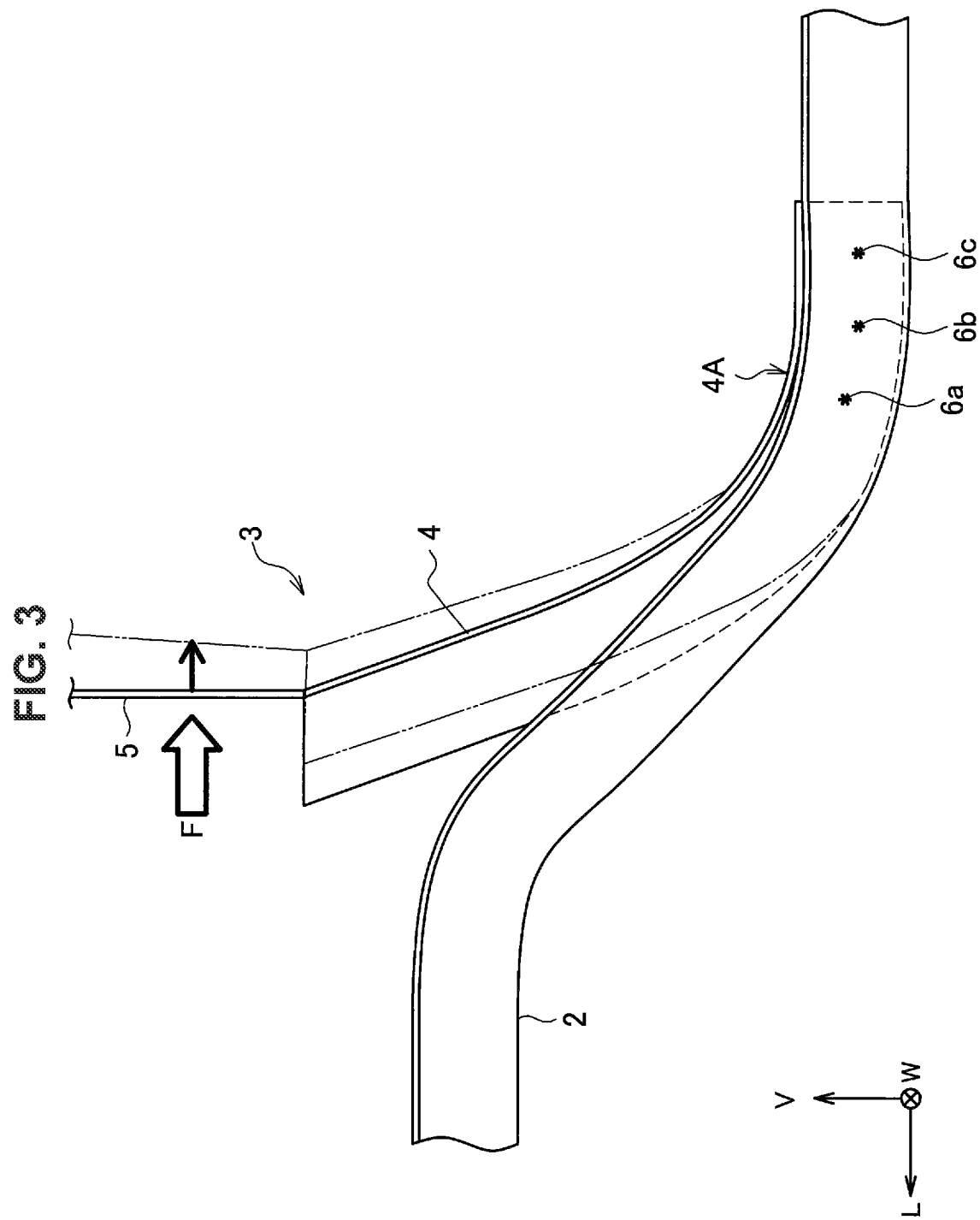

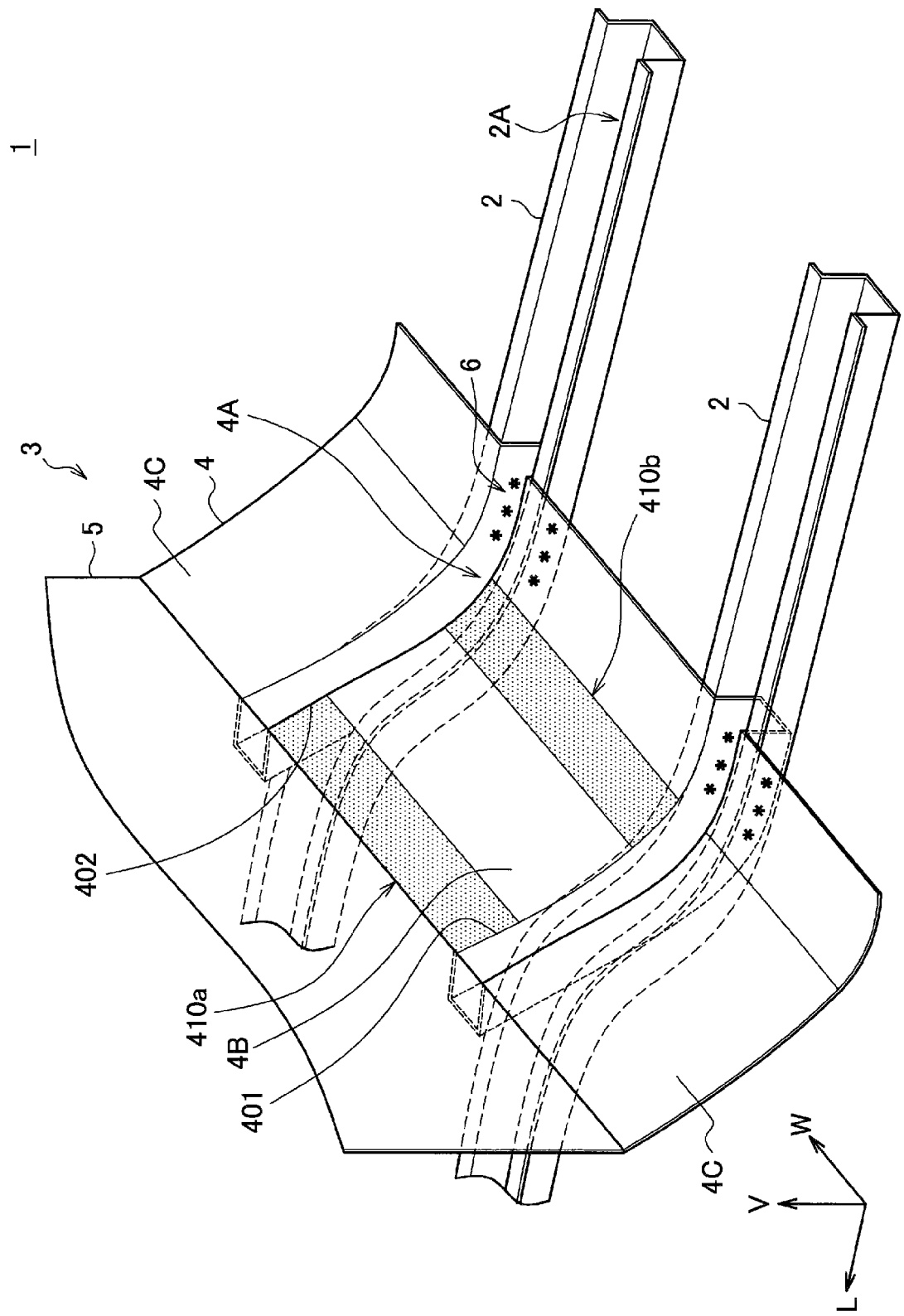

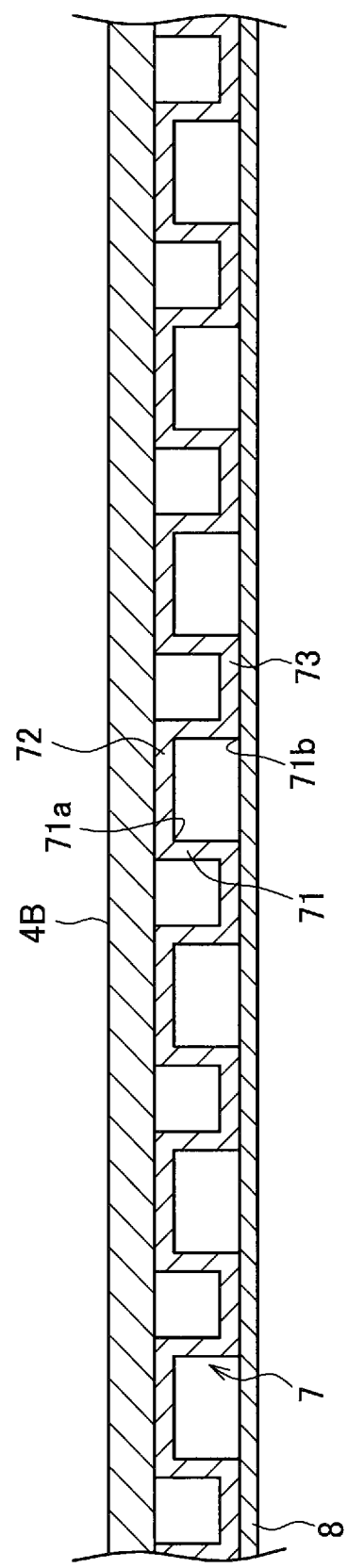

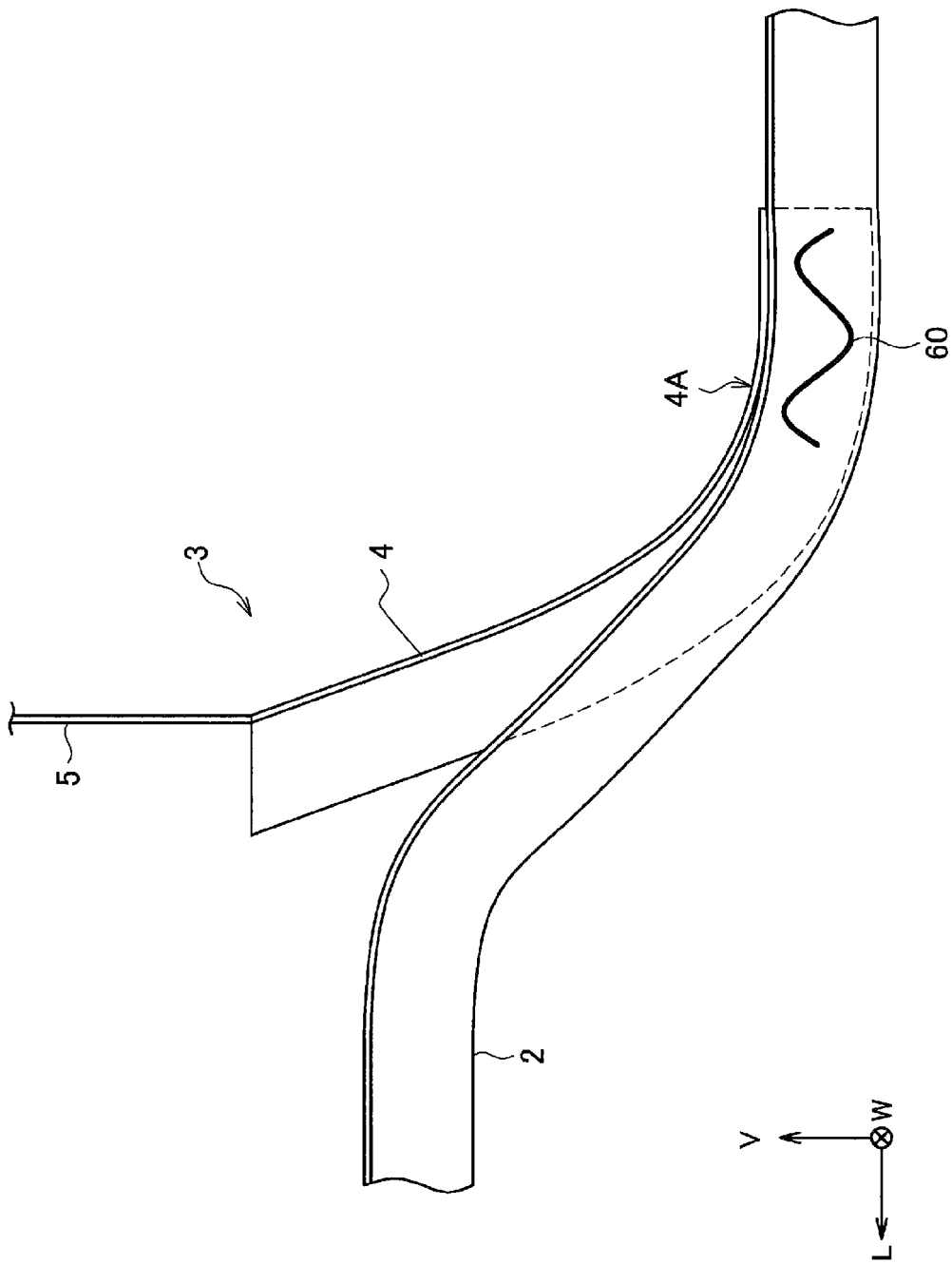

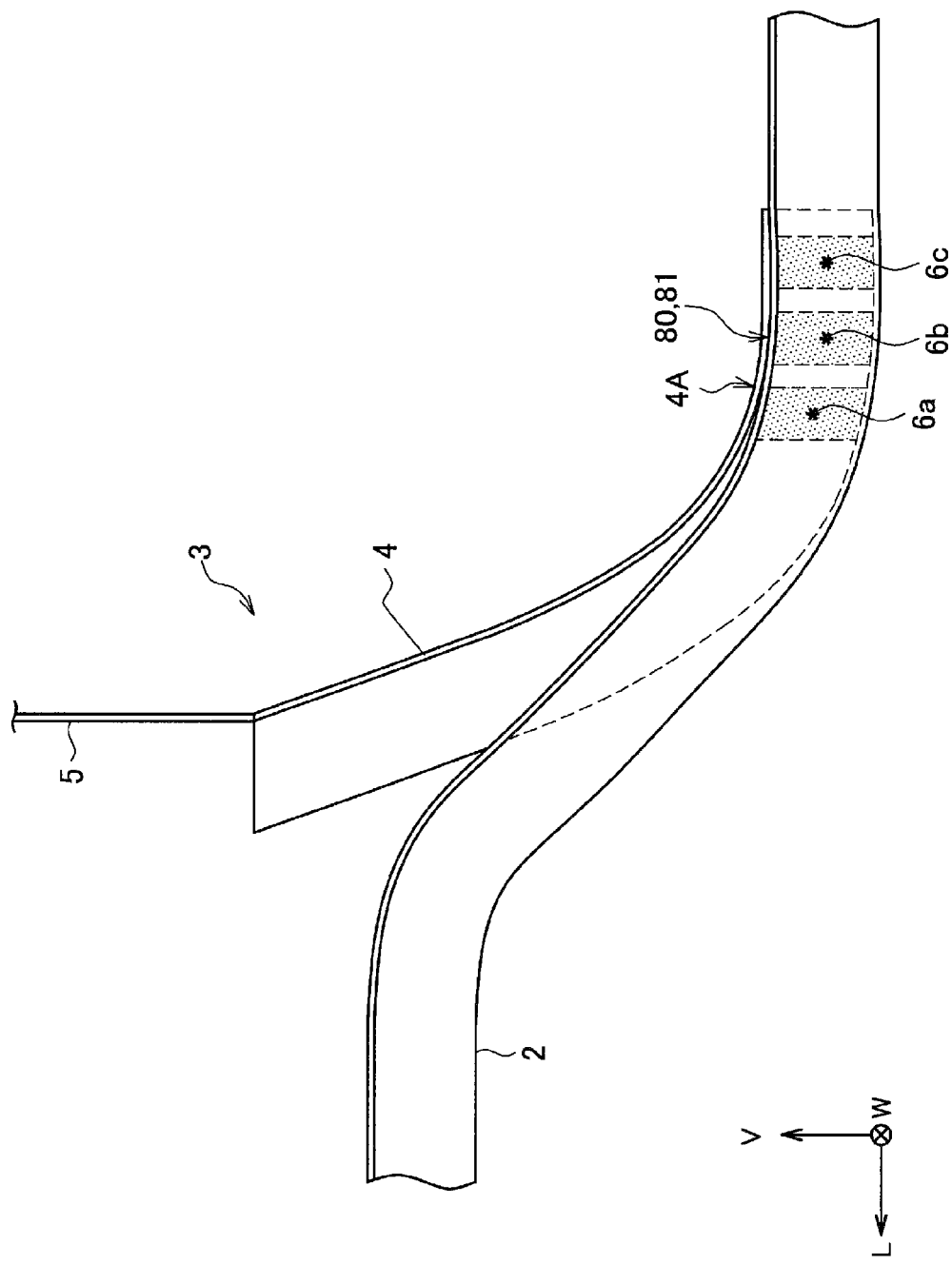

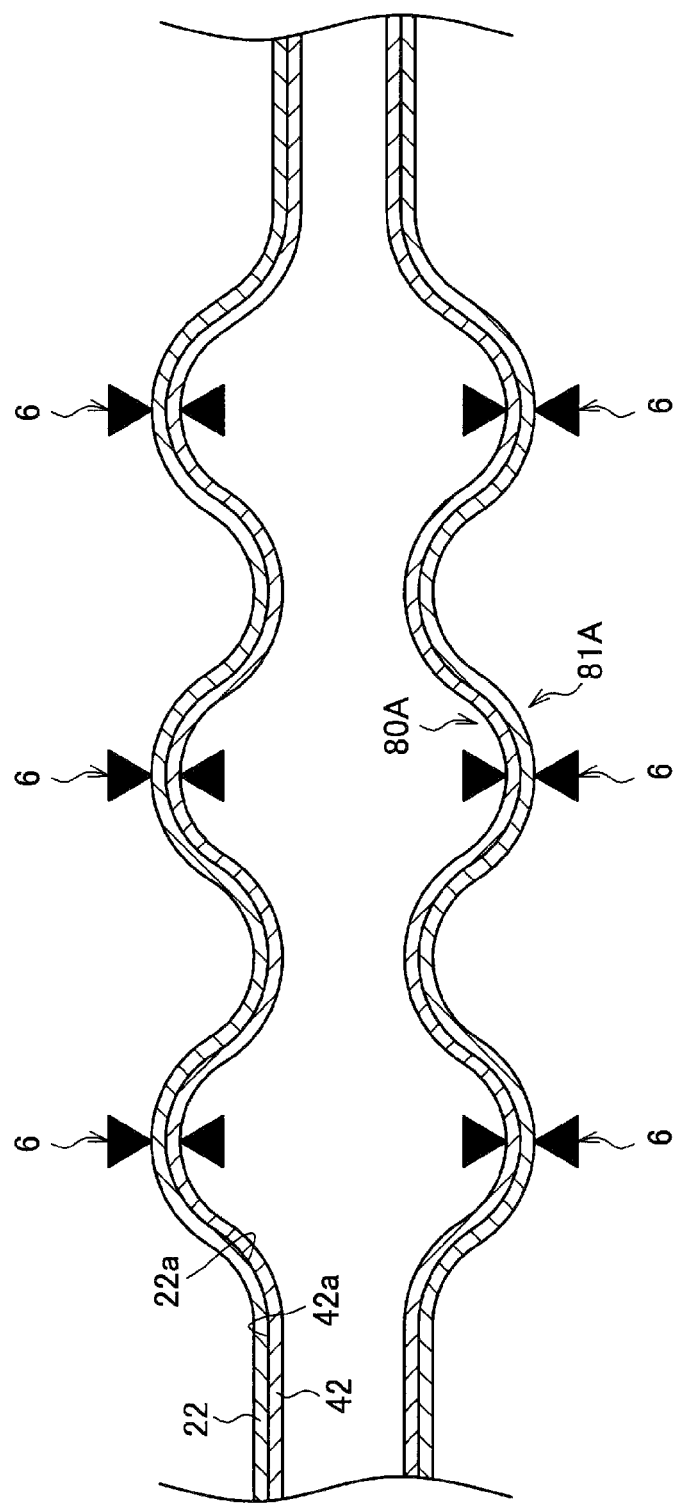

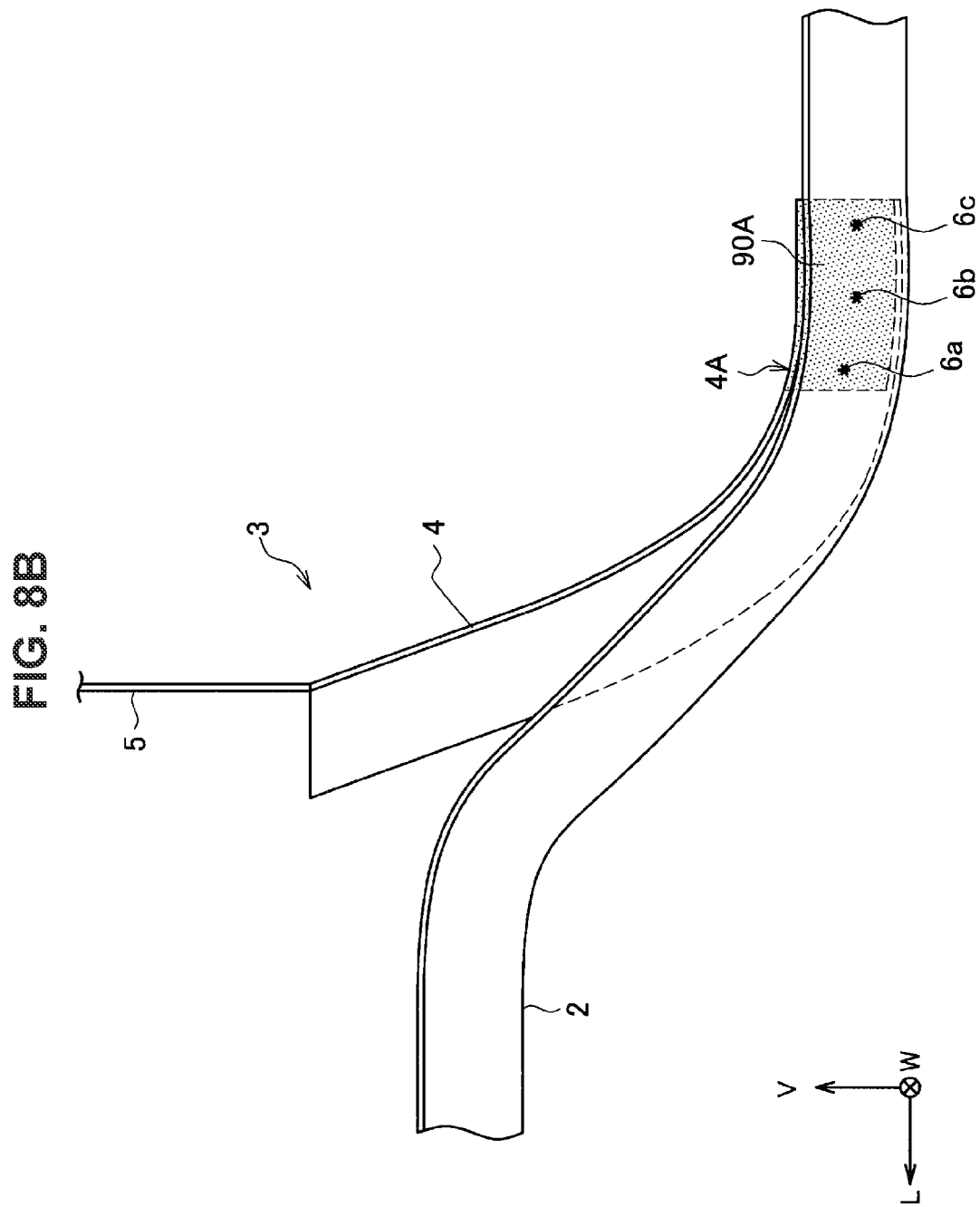

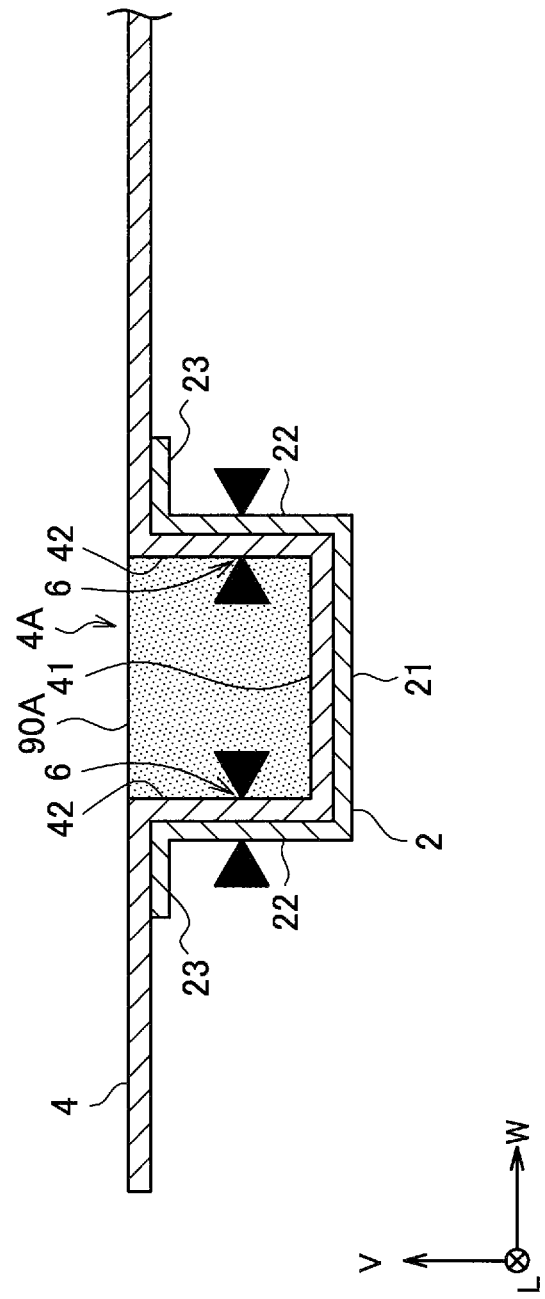

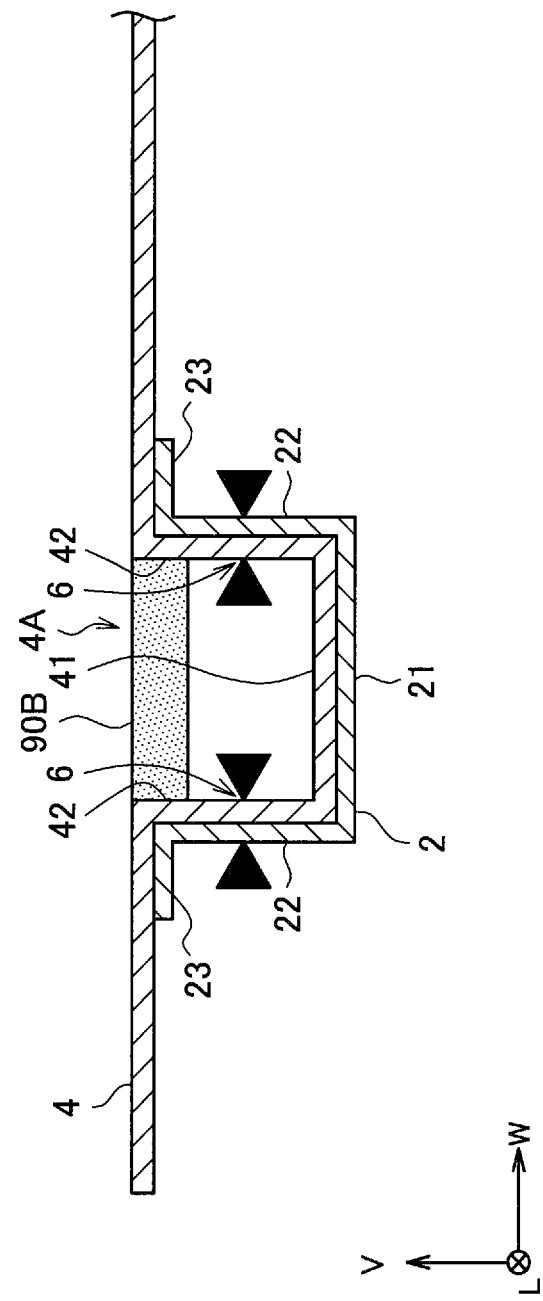

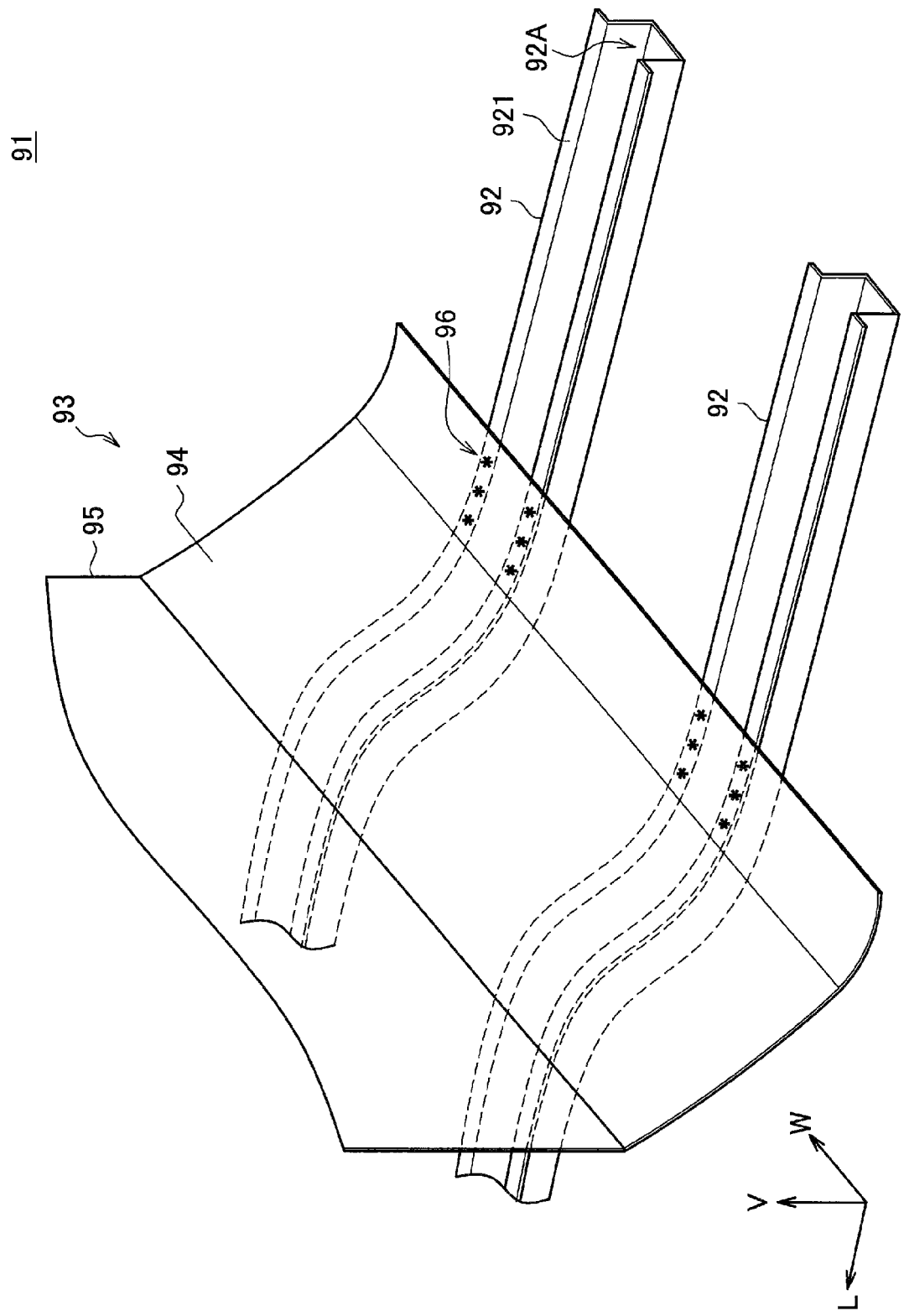

VEHICLE FRONT PORTION STRUCTURE

TECHNICAL FIELD

The present invention relates to a vehicle front portion structure.

BACKGROUND ART

These days, improvements in the fuel efficiency of automobiles are required from the viewpoint of global environment protection. On the other hand, the maintenance and improvement of collision safety of vehicles are required. In order to satisfy these requirements, high-strength, lightweight car body structures are being developed. For example, the use of a thin-walled, high-strength steel sheet is promoted mainly for a framework member such as a frame or a pillar.

In a front portion of a vehicle, a dash lower panel that partitions a cabin (car interior) and a front box provided on the front side of the cabin and housing an apparatus such as an engine or a motor is provided, for example. The dash lower panel is joined to framework members provided in the front portion of the vehicle, such as front side members or floor members.

For a vehicle front portion structure including such a dash lower panel and framework members, technology to improve collision safety to collision loads caused by collision due to a colliding body from the front side of the vehicle or by secondary collision from an engine or the like that has received collision due to the colliding body is being developed. For example, Patent Literature 1 below discloses a technology in which a member reinforcement is provided on the upper side of a front side member, and the member reinforcement is joined to a dash cross member provided on a dash panel. By this technology, the load bearing to a collision load can be improved. Further, Patent Literature 2 below discloses a technology in which a dashboard lower and a floor frame are connected together such that the ridgeline of a bead that is formed in the dashboard lower so as to protrude to the cabin side and the ridgeline of the floor frame overlap in the vertical direction. By this technology, a collision load received by the dashboard lower can be transferred to the floor frame with good efficiency.

CITATION LIST

Patent Literature

Patent Literature 1: JP 2013-10424A
Patent Literature 2: JP 2012-11959A

SUMMARY OF INVENTION

Technical Problem

In order to meet the fuel efficiency standard of automobiles, which may be made stricter in the future, it is required that the weight of the car body structure be further reduced. However, when it is attempted to further reduce the wall thickness of a framework member such as a front side member or a floor member, there are many cases where the collision energy absorption capacity is lower than the capacity envisaged at the time of design. Hence, for example, in a structure like those disclosed in Patent Literatures 1 and 2 above in which framework members are caused to absorb collision energy in a principal way, it is difficult to achieve both of further weight reduction and desired collision energy absorption capacity of a car body structure.

The present inventors have thought that, to further advance the weight reduction of a car body structure while maintaining collision safety to collisions from the front side of the vehicle, it is useful to cause not only the framework members mentioned above but also a dash lower panel, which has so far only played the role of partitioning spaces, to absorb collision energy. To this end, it is required to increase the strength and reduce the weight of the dash lower panel.

However, if a dash lower panel is simply welded to the framework members mentioned above, it is difficult to obtain a sufficient weld strength. This is because, when a collision load acts on the dash lower panel from the front side of the vehicle, there is a likelihood that the welded portions between the dash lower panel and the framework members mentioned above will break and both will peel off. In this case, the dash lower panel that has peeled off from the framework members is likely to bend to the cabin side due to a collision load from the front side of the vehicle. Therefore, a collision load cannot be sufficiently caught by the dash lower panel, and it is highly likely that a colliding body and an apparatus such as an engine loaded in the front box will enter the cabin side. Consequently, the collision safety of the car body may be impaired.

Thus, the present invention has been made in view of the problem mentioned above, and an object of the present invention is to provide a new and improved vehicle front portion structure capable of achieving a weight reduction of a car body structure while maintaining collision safety to collisions from the front side of the vehicle.

Solution to Problem

According to the present invention in order to achieve the above-mentioned object, there is provided a vehicle front portion structure including: a framework member in a gutter shape provided in a vehicle length direction from a front box to a cabin and having a side wall; and a dash lower panel that includes a gutter section having a side wall and fitted into an inside of the framework member and in which the side wall of the gutter section and the side wall of the framework member are joined together.

The side wall of the gutter section and the side wall of the framework member may be joined together by a joint section, and the joint section may be at least one of a weld, a fastening section, an adhesion section, and a sticking joint section.

The weld may be formed in a line continuing while winding in the vehicle length direction.

The weld may be formed by laser welding and/or arc welding.

The weld may be formed by spot welding or arc spot welding.

At least a part of the side wall of the gutter section may be provided with a first fitting groove extending in a vehicle height direction, the side wall of the framework member may be provided with a second fitting groove corresponding to the first fitting groove, and the first fitting groove may be fitted into the second fitting groove.

A contact member in contact with the side walls that mutually face each other of the gutter section may be provided inside the gutter section.

The contact member may be formed of a resin or a metal.

A depth of the gutter section may be more than or equal to 15 mm.

A pair of the gutter sections may be provided side by side in a vehicle width direction in the dash lower panel, and in an intermediate section located between the pair of gutter sections in the dash lower panel, a high-rigidity region having a rigidity higher than a rigidity of a portion on an outside in the vehicle width direction of the intermediate section in the dash lower panel may be provided from one end to another end in the vehicle width direction of the intermediate section.

A sheet thickness of a metal sheet in the high-rigidity region may be larger than a sheet thickness of the metal sheet in a portion other than the high-rigidity region in the dash lower panel.

A sheet member made of a resin may be joined to a metal sheet in the high-rigidity region.

A resin structure body including a plurality of cylindrical bodies of a same height, a top surface covering one end portion of each of the cylindrical bodies, and a base section connecting other end portions of adjacent ones of the cylindrical bodies may be joined to a metal sheet in the high-rigidity region via the top surfaces, and a sheet member made of a resin or paper may be joined to the base sections of the resin structure body.

A metal sheet in the high-rigidity region may have a concave-convex shape.

A pair of the gutter sections may be provided side by side in a vehicle width direction in the dash lower panel, and in an intermediate section located between the pair of gutter sections in the dash lower panel, a high-strength region having a tensile strength higher than a tensile strength of a portion on an outside in the vehicle width direction of the intermediate section in the dash lower panel may be provided from one end to another end in the vehicle width direction of the intermediate section.

The sheet thickness of the dash lower panel may be more than or equal to 1.0 mm and less than or equal to 2.0 mm.

The tensile strength of the dash lower panel may be more than or equal to 340 MPa.

The framework member may include at least one of a front side member and a floor member.

In the above configuration, side walls of the gutter section of the dash lower panel and side walls of the framework member are joined together. In this case, when a collision load acts on the dash lower panel from the front side of the vehicle, the breaking mode of the joint portion is a shear breaking mode. For high-strength steel sheets, the tensile strength of two members is larger in the shear breaking mode than in a plug breaking mode in which breaking occurs in a direction in which both cleave; therefore, the breaking of the joint portion is less likely to occur. Thus, even when a collision load acts on the dash lower panel from the front side of the vehicle, the breaking of the joint portion is less likely to occur. Hence, the dash lower panel is less likely to bend to the cabin side, and can therefore absorb collision energy sufficiently. Thereby, not only a weight reduction of the dash lower panel but also a weight reduction of the framework members mentioned above can be achieved. Thus, a weight reduction of the car body can be achieved without impairing collision safety.

Advantageous Effects of Invention

As described above, according to the present invention, a weight reduction of a car body structure can be achieved while collision safety to collisions from the front side of the vehicle is maintained.

BRIEF DESCRIPTION OF DRAWINGS

FIG. 1 is a perspective view showing a rough configuration of a vehicle front portion structure according to an embodiment of the present invention.

FIG. 2 is a cross-sectional view of a framework member and a dash lower panel taken along a II-II cutting line of FIG. 1.

FIG. 3 is a diagram showing an example of a behavior of a dash lower panel according to the embodiment when a collision load acts on the dash lower panel.

FIG. 4B is a diagram showing a second example of a high-rigidity region provided in an intermediate section according to the embodiment.

FIG. 5 is a diagram showing a configurational example of a resin structure body and a sheet member according to the embodiment.

FIG. 6 is a diagram showing an example of a weld formed in a line continuing while winding in a vehicle length direction.

FIG. 7A is a side view showing a state of a framework member 2 and a gutter section 4A in a case where first fitting grooves are fitted into second fitting grooves.

FIG. 7B is a cross-sectional view showing a first example showing a state of a framework member and a gutter section in a case where first fitting grooves are fitted into second fitting grooves.

FIG. 8B is a side view showing the first example of the contact member and specifically showing a rough configuration of the vehicle front portion structure including the contact member.

FIG. 8C is a cross-sectional view of the first example of the contact member and specifically showing a framework member and a dash lower panel in the vehicle front portion structure including the contact member.

FIG. 8D is a diagram showing a second example of a contact member.

FIG. 9 is a perspective view showing a rough configuration of a conventional vehicle front portion structure.

DESCRIPTION OF EMBODIMENTS

Figure 4A:
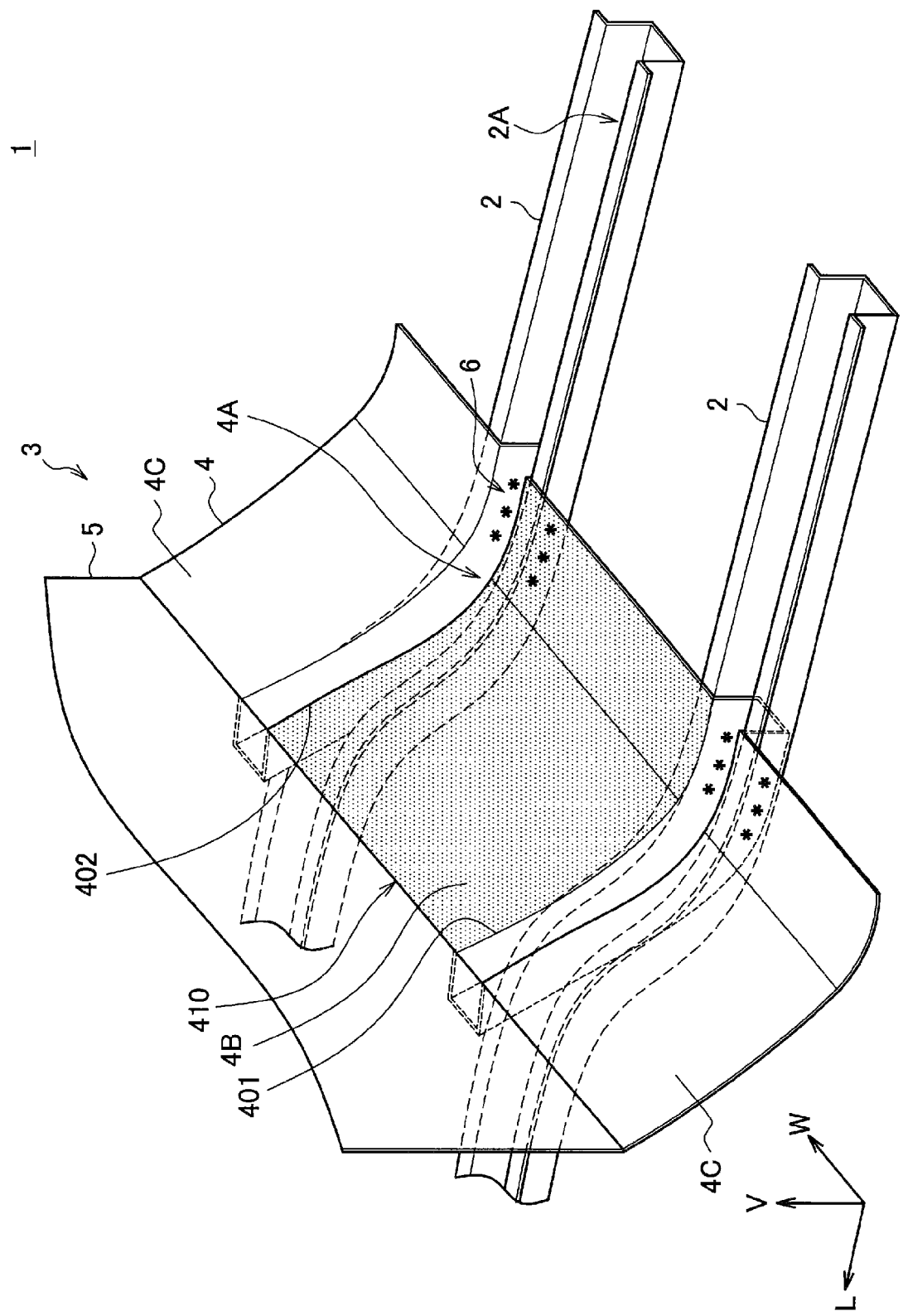
FIG. 4A is a diagram showing a first example of a high-rigidity region provided in an intermediate section according to the embodiment.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

In the following description, terms indicating front-rear relationships such as "the front side," "the rear side," and "the rear end" refer to, unless otherwise specified, directional or positional relationships in the vehicle length direction L.

<<1. Background>>

Before describing the configuration of a vehicle front portion structure according to each embodiment of the present invention, the background with which the present invention has been conceived is described.

FIG. 9 is a perspective view showing a rough configuration of a conventional vehicle front portion structure. As shown in FIG. 9, a vehicle front portion structure 91 includes framework members 92 and 92 and a dash lower panel 93.

The framework member 92 is a frame member of at least one of a front side member and a floor member provided to extend in the vehicle length direction L. The framework member 92 may also be a member obtained by joining a rear portion of a front side member and a front portion of a floor member. The framework member 92 has a gutter shape section 92A in which the upper side is opened, and includes flanges 921. In the framework member 92, a curved shape that is offset in the vehicle height direction V from the rear side to the front side of the vehicle is provided.

The dash lower panel 93 is a member partitioning a front box and a cabin of the vehicle. That is, the front box exists more on the front side of the vehicle than the dash lower panel 93, and the cabin exists more on the rear side of the vehicle than the dash lower panel 93. The dash lower panel 93 is provided on the upper side of the framework members 92 and 92. The dash lower panel 93 has an inclined wall 94 and a vertical wall 95. As shown in FIG. 9, a portion from the rear end to an intermediate place of the inclined wall 94 is in contact with the framework member 92 along the curved shape of the framework member 92. Further, an inclination separated from the framework member 92 is provided in the inclined wall 94, from the intermediate place of a rear portion to a front portion of the inclined wall 94. The rear end of the inclined wall 94 is joined to a not-illustrated floor panel.

As shown in FIG. 9, the vehicle front portion structure 91 is formed by the framework members 92 and the dash lower panel 93 being joined together. Specifically, the vehicle front portion structure 91 is formed by the flanges 921 and a rear portion of the inclined wall 94 being joined together in the places indicated by the asterisks of FIG. 9 by a joining means such as spot welding (the joined portion is referred to as a joint section 96).

When the vehicle front portion structure 91 shown in FIG. 9 receives a collision from the front side of the vehicle, a load caused by the collision acts on the framework members 92 and the dash lower panel 93. The framework members 92 play the role of absorbing collision energy by crushing due to the collision load.

Further, when a colliding body that is unlikely to directly collides against the framework members 92, such as a utility pole, collides against the vehicle, or when an apparatus such as an engine housed in the front box receives a collision caused by any colliding body, there is a case where a collision load acts on the dash lower panel 93 in a principal way. In this case, the collision load acting on the dash lower panel 93 in a principal way is transferred from the dash lower panel 93 to the framework members 92 via the joint sections 96. Consequently, the framework members 92 absorb collision energy caused by the collision load; thus, the collision safety of the vehicle can be maintained even when a collision load does not directly act on the framework members 92.

The present inventors have thought that it is also possible to further absorb collision energy by molding the dash lower panel 93 using a high-strength steel sheet and thereby allowing the dash lower panel 93 to catch impact force caused by collision and to plastically deform.

However, in the case where the framework member 92 and the dash lower panel 93 are formed of a thin, high-strength steel sheet in order to increase the strength and reduce the weight of the car body, it is highly likely that the joint strength will be reduced by an increase in difficulty of welding due to an increased carbon content of the steel sheet, stress concentration of the joint portion due to an increased hardness, etc. Hence, in the conventional vehicle front portion structure 91, when a collision load that has acted on the dash lower panel 93 is being transferred to the framework members 92 via the joint sections 96, it is highly likely that the joint strength of the joint section 96 will be insufficient and the joint section 96 will break. Consequently, there is a concern that the dash lower panel 93 will bend to the cabin side by receiving a collision load. Therefore, it is highly likely that an apparatus such as an engine that has received a colliding body or a collision load caused by the colliding body will enter the cabin side while causing the dash lower panel 93 to bend to the rear side of the vehicle. That is, the collision safety of the vehicle may be impaired.

Thus, the present inventors conducted extensive studies, and have conceived that the joint strength can be increased and the breaking of the joint portion can be hindered by setting the breaking mode of the joint portion between the dash lower panel and the framework member to not a breaking mode in the peeling direction but a breaking mode in the shear direction. The present inventors have found that the function of absorbing collision energy by the dash lower panel can be caused to be exhibited by this method. Thus, the present inventors have developed a vehicle front portion structure capable of achieving the function of absorbing collision energy by the dash lower panel. As a result, it has been shown that a weight reduction of the entire car body structure can be achieved while collision safety is maintained. The configuration of a vehicle front portion structure according to an embodiment of the present invention will now be described.

2. Embodiments

<2.1. Configuration>

FIG. 1 is a perspective view showing a rough configuration of a vehicle front portion structure 1 according to an embodiment of the present invention. As shown in FIG. 1, the vehicle front portion structure 1 according to the present embodiment includes framework members 2 and 2 and a dash lower panel 3.

A pair of framework members 2 and 2 are provided to extend in the vehicle length direction L at the left and right of a vehicle. The framework member 2 is, for example, a member of at least one of a front side member and a floor member. The framework member 2 according to the present embodiment is a member formed by the rear end of a front side member and the front end of a floor member being joined together. The joint position in the vehicle length direction L between the front side member and the floor member is not particularly limited. As shown in FIG. 1, the framework member 2 according to the present embodiment has a gutter shape section 2A in which the upper side is opened. In the framework member 2, a curved shape offset in the vehicle height direction V is provided from the rear side to the front side of the vehicle. Such a framework member 2 is formed of, for example, a metal sheet such as a steel sheet.

The dash lower panel 3 is a member that partitions a front box and a cabin of the vehicle. That is, the front box exists more on the front side of the vehicle than the dash lower panel 3, and the cabin exists more on the rear side of the vehicle than the dash lower panel 3. In the front box, for example, any of various apparatuses such as an engine, a motor, and a battery may be housed. That is, the front box is an example of an engine room or a motor room. The front box may also be a trunk room in which baggage etc. are loaded. The cabin is a space that a crew member gets in. The dash lower panel 3 is provided on the upper side of the framework members 2 and 2.

The dash lower panel 3 has an inclined wall 4 and a vertical wall 5. As shown in FIG. 1, a rear portion in the vehicle length direction L of the inclined wall 4 (hereinafter, occasionally referred to as simply a rear portion of the inclined wall 4) has a shape whereby the rear portion is in contact with flanges of the framework members 2. A portion from the rear end to an intermediate place of the inclined wall 4 is in contact with the framework member 2 along the curved shape of the framework member 2. Further, an inclination separated from the framework member 2 is provided in the inclined wall 4, from the intermediate place of a rear portion of the inclined wall 4 to a front portion in the vehicle length direction L of the inclined wall 4. The rear end of the inclined wall 4 is joined to a not-illustrated floor panel.

In the inclined wall 4 of the dash lower panel 3 according to the present embodiment, gutter sections 4A are provided on the front box side along the vehicle length direction L. The gutter sections 4A are provided on the inclined wall 4 so as to be fitted into the insides of the gutter shape sections 2A of the framework members 2 and 2. As shown in FIG. 1, the gutter section 4A may be provided to run longitudinally in the vehicle length direction L of the inclined wall 4, or may be partly provided in a rear portion of the inclined wall 4. Although details are described later, the length in the vehicle length direction L of the gutter section 4A is not particularly limited as long as the gutter section 4A is provided so as to be at least partly fitted into the gutter shape section 2A of the framework member 2. The gutter section 4A is provided during the molding of the dash lower panel 3, such as based on press molding, for example.

Although not shown in FIG. 1, for example, a tunnel section expanding upward may be formed in a central portion in the vehicle width direction W of the inclined wall 4. In the case where an engine is housed in the front box, the tunnel section may be provided in order to install, through a lower portion of the vehicle, an exhaust pipe that allows exhaust gas discharged from the engine to pass therethrough or a drive shaft for driving rear wheels.

The upper end of the vertical wall 5 may be joined to a not-illustrated dash upper panel. In this case, a dash panel is formed by the dash lower panel 3 and the dash upper panel. The vertical wall 5 may be a portion integrated with a dash upper panel. In this case, the dash lower panel is formed as a dash panel. In order to improve the strength of the dash lower panel 3, for example, a not-illustrated dash cross member may be provided on the front surface side of the vertical wall 5 along the vehicle width direction W.

Such a dash lower panel 3 is obtained by, for example, a metal sheet in a flat sheet shape being subjected to molding such as press molding. Specifically, the dash lower panel 3 is obtained by press-molding a steel sheet. The steel sheet is preferably a high-tensile steel material with a tensile strength of more than or equal to 340 MPa. The tensile strength of the steel sheet is further preferably more than or equal to 980 MPa. The sheet thickness of the dash lower panel 3 is preferably more than or equal to 1.0 mm and less than or equal to 2.0 mm. When the sheet thickness is larger than 1.0 mm and smaller than 2.0 mm, a sufficient weight reduction of the car body can be achieved while the strength is ensured. The sheet thickness is set in accordance with the required strength and weight, as appropriate.

As shown in FIG. 1, the vehicle front portion structure 1 according to the present embodiment is formed by the gutter section 4A of the dash lower panel 3 being fitted into the inside of the framework member 2 and side walls of the gutter section 4A and side walls of the framework member 2 being joined together by spot welding or the like. The joining of the framework member 2 and the dash lower panel 3 will now be described.

FIG. 2 is a cross-sectional view of the framework member 2 and the dash lower panel 3 taken along the II-II cutting line of FIG. 1. As shown in FIG. 2, the framework member 2 has a bottom wall 21, a pair of side walls 22 and 22 standing upright from the bottom wall 21, and a pair of flanges 23 and 23 extending from the side walls 22 to the outside along the vehicle width direction W. In the inclined wall 4 of the dash lower panel 3, the gutter section 4A formed by a bottom wall 41 and a pair of side walls 42 standing upright from the bottom wall 41 is provided.

The shape of the bottom wall 21 of the framework member 2 and the bottom wall 41 of the gutter section 4A is not particularly limited. For example, the bottom wall 21 and the bottom wall 41 may be flat as shown in FIG. 2, or may have concavities and convexities. Further, the bottom wall 21 and the bottom wall 41 may have a plurality of surfaces. In this case, a winding portion may be provided between surfaces, for example.

The pair of facing side walls 22 of the framework member 2 extend in the vehicle length direction, and extend approximately in the vehicle height direction. Although it is ideal that the side wall 22 be caused to extend in complete agreement with the vehicle height direction, this is difficult in practice. It is preferable that, in a cross section in the vehicle length direction, the angle between the pair of facing side walls 22 of the framework member 2 be more than or equal to 0 degrees and less than or equal to 30 degrees. In this way, the bottom wall 21 and the pair of side walls 22 are provided in the gutter shape section 2A of the framework member 2. Since the side wall 22 extends in the vehicle height direction, the joint strength between the framework member 2 and the gutter section 4A can be ensured. The mechanism of this will be described later. The above similarly applies to the angle between the pair of facing side walls 42 of the gutter section 4A. That is, the bottom wall 41 and the pair of side walls 42 are provided in the gutter section 4A. Note that gutter sections of a framework member and an inclined wall not having the bottom wall 21 (41) (that is, a bottom surface does not exist), such as a gutter shape with a cross section of a triangle, are not included in the scope of the present invention.

As shown in FIG. 2, the inner side surfaces 22a of the side walls 22 of the framework member 2 and the outer side surfaces 42a of the side walls 42 of the gutter section 4A of the dash lower panel 3 are in contact with each other. At this time, the side walls 22 and the side walls 42 are joined together in the places indicated by the triangles in the drawing. The portion where the side wall 22 and the side wall 52 are joined together is referred to as a joint section 6. In FIG. 1, joint sections 6 are formed in the places indicated by the asterisks. The means for obtaining the joint section 6 may be, for example, joining by spot welding. In this case, joint sections 6 may be provided at a prescribed interval along the vehicle length direction L. The prescribed interval is set on the basis of the size, material, etc. of the framework member 2, as appropriate. It is preferable that the position of the joint section 6 in the height direction (substantially the vertical direction) between the side wall 22 and the side wall 42 be an approximately middle position. Thereby, the joint area can be ensured as much as possible.

As a joining technique other than spot welding to obtain the joint section 6, a known welding technique such as arc welding such as tungsten inert gas (TIG) welding, metal inert gas (MIG) welding, or plasma welding, laser welding, or electron beam welding may be used. Also a fastening technique using a rivet, a bolt, or the like, a joining technique based on sticking joining, or an adhesion technique based on an adhesive or the like may be used as a joining technique to obtain the joint section 6.

Other examples of means for obtaining the joint section 6 will be described later.

In an intermediate section 4B of the inclined wall 4 of the dash lower panel 3 located between the pair of gutter sections 4A and 4A shown in FIG. 1, a region (high-rigidity region) having a rigidity higher than the rigidity of a portion (for example, an outer sheet section 4C located on the outside of the gutter section 4A) on the outside in the vehicle width direction of the intermediate section 4B may be provided. The high-rigidity region may be provided at least from one end 401 to the other end 402 in the vehicle width direction of the intermediate section 4B. As described later, the high-rigidity region may be provided in the whole or part of the intermediate section 4B.

Specific means for rigidity increase in the high-rigidity region of the intermediate section 4B will be described later.

Further, in the intermediate section 4B, a region (high-strength region) having a tensile strength higher than the tensile strength of a portion (for example, the outer sheet section 4C located on the outside of the gutter section 4A) on the outside in the vehicle width direction of the intermediate section 4B may be provided. The high-strength region may be provided at least from one end 401 to the other end 402 in the vehicle width direction of the intermediate section 4B. As described later, the high-strength region may be provided in the whole or part of the intermediate section 4B.

The dash lower panel 3 including the intermediate section 4B having the high-strength region is obtained by, for example, press-processing a tailored blank including a steel sheet section in which the tensile strength of the portion corresponding to the intermediate section 4B is set relatively high.

<2.2. Working and Effect>

FIG. 3 is a diagram showing an example of a behavior of the dash lower panel 3 according to the present embodiment when a collision load F acts on the dash lower panel 3. Joint sections 6a to 6c are formed using spot welding while side walls of the gutter section 4A provided in the inclined wall 4 and side walls of the framework member 2 are kept in contact; thereby, the dash lower panel 3 and the framework member 2 are joined together.

Thus, when a collision load F acts on the dash lower panel 3 from the front side of the vehicle in a principal way, the dash lower panel 3 exhibits a deformation mode like moving away from the framework member 2. In this case, force (shear force) of being drawn in in-plane directions of the joint surfaces in the joint section 6 between the side wall 42 of the gutter section 4A of the dash lower panel 3 and the side wall 22 of the framework member 2 is generated between the dash lower panel and the framework member. Then, like in what is called a shear breaking mode, a behavior like one in which the joint surfaces shift in in-plane directions is exhibited in the joint section 6.

On the other hand, in the vehicle front portion structure 1 shown in FIG. 9, the dash lower panel 93 is joined via the flange 921 of the framework member 92. Then, when a collision load acts on the dash lower panel 93 from the front side of the vehicle, the dash lower panel 93 exhibits a mode of deforming in a direction of moving away from the framework member 92. In this case, force of being drawn in directions orthogonal to the joint surfaces of the dash lower panel 93 and the framework member 92 is generated between the dash lower panel 93 and the framework member 92. Then, like in what is called a plug breaking mode, a behavior like one in which the joint surfaces peel off is exhibited in the joint section 96.

In general, the tensile shear strength (TSS) of one joint section tends to be higher than the cross tensile strength (CTS) of the joint section. That is, the tensile strength in the shear directions of the joint surfaces related to the shear breaking mode is superior to the tensile strength in the peeling directions of the joint surfaces related to the plug breaking mode. In the vehicle front portion structure 1 according to the present embodiment, the side wall of the framework member 2 and the side wall of the gutter section 4A of the dash lower panel 3 are joined together, and thereby the shear breaking mode can be caused to occur in the joint section 6. That is, when a collision load acts on the dash lower panel 3, a behavior of not the plug breaking mode but the shear breaking mode is exhibited, and hence the joint strength of the joint section 6 is practically increased. Therefore, the breaking of the joint section 6 can be hindered. Thus, peeling between the framework member 2 and the dash lower panel 3 is less likely to occur.

In this case, when a collision load F acts on the dash lower panel 3 from the front side of the vehicle as shown in FIG. 3, the joint strength of the joint section 6 can be increased. That is, the breaking of the joint section 6 can be hindered. Consequently, even when a high collision load F acts on the dash lower panel 3, the breaking of the joint section 6 does not occur, and the framework member 2 sufficiently supports the dash lower panel 3 via the joint section 6. Thereby, the dash lower panel 3 that has received a collision load does not bend to the cabin side, but can catch the collision load and plastically deform. Thereby, the dash lower panel 3 can absorb collision energy. Therefore, the transfer of impact force to the cabin side and the entry of a colliding body or the like can be prevented. Thus, the collision safety of the car body can be enhanced.

The present inventors have found that, as the steel sheet becomes stronger and lighter in weight, the shear breaking mode becomes more superior in tensile strength to the plug breaking mode. In particular, it has been revealed that, for a steel sheet with a tensile strength of more than or equal to 780 MPa, the difference in tensile strength between the two breaking modes described above is significantly large. That is, by increasing the strength and reducing the weight of the steel sheet that forms the dash lower panel 3, the joint strength of the joint section 6 according to the present embodiment is further increased, and hence joint breaking can be hindered. Thus, collision safety exhibited by the vehicle front portion structure according to the present embodiment is further enhanced by the steel sheet that forms the dash lower panel 3 being increased in strength and reduced in weight.

In order to bring about only the shear breaking mode, it is ideal that the pair of facing side walls 22 of the framework member 2 extend in the vehicle height direction and also the pair of side walls 42 of the gutter section 4A extend in the vehicle height direction. That is, it is preferable that both the angle between the pair of facing side walls 22 of the framework member 2 and the angle between the pair of side walls 42 of the gutter section 4A be 0 degrees. However, in the actual processing of a gutter shape, when the gutter shape is produced by press molding or the like, springback or the like may occur, and hence there is a case where the angle between the pair of side walls 22 (the pair of side walls 42) is larger than 0 degrees. That is, it is difficult to cause the pair of side walls 22 (the pair of side walls 42) to extend in complete agreement with the vehicle height direction. Even in this case, when the angle between the pair of side walls 22 (the pair of side walls 42) is more than or equal to 0 degrees and less than or equal to 30 degrees, the shear breaking mode is dominant, and therefore the joint strength can be practically improved.

Furthermore, by providing the high-rigidity region in the intermediate section 4B from one end 401 to the other end 402 in the vehicle width direction of the intermediate section 4B, the intermediate section 4B occupying the area of a large part of the dash lower panel 3 is less likely to twist. In this case, even when a collision load F acts from the front side of the vehicle, the dash lower panel 3 is less likely to twist, and accordingly also the pair of framework members 2 are less likely to twist relatively. Consequently, the framework member 2 is restrained to the dash lower panel 3 more reliably at the time of collision. Thereby, the deformation mode of the framework member 2 is stabilized. Thus, the collision safety of the vehicle front portion structure 1 can be caused to be exhibited as much as possible.

Moreover, by providing the high-rigidity region in the intermediate section 4B, sound insulation effect can be obtained. Thereby, the intermediate section 4B blocks noise such as road noise and vibration, and therefore noise and vibration can be hindered from being transmitted to the interior of the vehicle. Thus, the comfortableness of the interior of the vehicle can be improved.

Furthermore, by increasing the tensile strength of the intermediate section 4B, even when an object collides against the portion of the intermediate section 4B of the dash lower panel 3 from the front side of the vehicle, the intermediate section 4B can prevent the entry of the object toward the inside of the car. Furthermore, by increasing the tensile strength of the intermediate section 4B in the case where the high-rigidity region is provided in the intermediate section 4B, the range allowing elastic deformation, in which the rigidity of the intermediate section 4B can be maintained, can be expanded. Thereby, the framework members 2 are less likely to twist relatively. Thus, the collision safety of the vehicle front portion structure 1 can be further enhanced.

<2.3. Modification Examples>

It goes without saying that the present invention is not limited to the examples shown in the above embodiment. For example, although as shown in FIG. 2 and FIG. 3 the bottom wall 41 of the gutter section 4A is in partial contact with the bottom wall 21 of the framework member 2, the present invention is not limited to this example. More specifically, the bottom wall 41 of the gutter section 4A may be in contact with the bottom wall 21 of the framework member 2 throughout in the vehicle length direction L, or the bottom wall 41 may not be in contact with the bottom wall 21. However, it is preferable to ensure a sufficient depth of the gutter section 4A (a sufficient height of the side wall 42) in order to join together the side wall 42 of the gutter section 4A and the side wall 22 of the framework member 2 by spot welding or the like. This is because the strength improves as the depth of the gutter section 4A becomes larger, and the weight of the structure can be reduced as the depth of the gutter section 4A becomes smaller. Specifically, the depth of the gutter section 4A is preferably more than or equal to 15 mm. The depth of the gutter section 4A is set in accordance with the required strength and weight, as appropriate. In the case where the bottom wall 41 is in contact with the bottom wall 21, joining may be performed further in this contact place by spot welding or the like. Thereby, the joint strength can be further increased. Further, the flange 23 of the framework member 2 may be joined to the inclined wall 4. Thereby, the joint strength can be further increased. The flange 23 may not necessarily be in contact with the inclined wall 4.

The cross-sectional shape in a cross section orthogonal to the vehicle length direction L of the framework member 2 and the gutter section 4A of the dash lower panel 3 is not limited to a shape like that shown in FIG. 2. For example, the cross-sectional shape of the framework member 2 and the gutter section 4A may also be a U-like shape in which the bottom wall is a curved surface, a V-like shape in which the side wall is inclined, or the like. The cross-sectional shape of the framework member 2 and the gutter section 4A, such as the shape of the bottom wall, is not particularly limited as long as the side wall 22 of the framework member 2 and the side wall 42 of the gutter section 4A are joined together via the joint section 6. Further, the cross-sectional shape of the framework member 2 and the cross-sectional shape of the gutter section 4A are not necessarily the same or similar.

A cover member may be provided on the upper side of the gutter section 4A of the dash lower panel 3 so that a foot of a crew member or a foreign body does not enter the inside of the gutter section 4A.

<2.4. Specific Examples of Rigidity Increase>

Next, specific techniques to increase the rigidity of the high-rigidity region in the case where the high-rigidity region is provided in the intermediate section 4B of the dash lower panel 3 in the vehicle front portion structure 1 according to the present embodiment are described.

FIG. 4A is a diagram showing a first example of a high-rigidity region 410 provided in the intermediate section 4B according to the present embodiment. As shown in FIG. 4A, a high-rigidity region 410 may be provided on the entire surface from one end 401 to the other end 402 in the vehicle width direction of the intermediate section 4B. By the high-rigidity region 410 being provided in this way, a relative twist of both ends of the intermediate section 4B can be suppressed. Consequently, a relative twist of the pair of framework members 2 is suppressed. Thereby, it becomes possible to absorb a larger amount of impact at the time of collision.

FIG. 4B is a diagram showing a second example of the high-rigidity region 410 provided in the intermediate section 4B according to the present embodiment. As shown in FIG. 4B, a plurality of high-rigidity regions 410a and 410b may be provided in the intermediate section 4B. In this way, high-rigidity regions 410 may be provided only in parts of the intermediate section 4B. Further, as shown in FIG. 4B, a plurality of high-rigidity regions 410 may be provided in a row in the vehicle length direction. Further, a plurality of high-rigidity regions 410 may be provided so as to cross on the intermediate section 4B. In short, it is sufficient that the high-rigidity region 410 be provided so as to continue from one end to the other end in the vehicle width direction in at least a part of the intermediate section 4B. Similarly, it is sufficient that the high-strength region be provided so as to continue from one end to the other end in the vehicle width direction in at least a part of the intermediate section 4B.

A rigidity increase of the high-rigidity region 410 can be achieved by the means described below. For example, the sheet thickness of the metal sheet in the high-rigidity region 410 may be set larger than the sheet thickness of a portion of the dash lower panel 3 other than the high-rigidity region 410. In the present embodiment, the sheet thickness of the metal sheet in the high-rigidity region 410 may be set larger than the sheet thickness of a portion on the outside of the intermediate section 4B (for example, the outer sheet section 4C). Thereby, the rigidity in the high-rigidity region 410 can be increased. The dash lower panel 3 including the high-rigidity region 410 in which the sheet thickness of the metal sheet is relatively large can be obtained by, for example, a tailored blank or a tailor rolled blank.

Further, a sheet member made of a resin may be joined to the metal sheet in the high-rigidity region 410. The sheet member may be joined to one surface or both surfaces of the metal sheet in the high-rigidity region 410. In the case where the sheet member is joined to one surface of the metal sheet, the sheet member may be joined to either of the inside and the outside of the vehicle. The rigidity of the high-rigidity region 410 can be increased by joining the sheet member made of a resin to the metal sheet in the high-rigidity region 410.

The resin that forms the sheet member is preferably a foaming-hardening resin, for example. It is further preferable that the resin have vibration damping performance. The method for joining the sheet member and the metal sheet together is not particularly limited. For example, in the case where the resin that forms the sheet member is a foaming-hardening resin, the sheet member and the metal sheet may be joined together by the adhesive strength of the resin formed on the surface of the metal sheet.

Further, a resin structure body may be joined along with the sheet member to the metal sheet in the high-rigidity region 410. FIG. 5 is a diagram showing a configurational example of a resin structure body 7 and a sheet member 8 according to the present embodiment. Referring to FIG. 5, the resin structure body 7 according to the present embodiment includes a plurality of cylindrical bodies 71 of the same height, a top surface 72 covering one end portion 71a of each of the cylindrical bodies 71, and a base section 73 connecting other end portions 71b of cylindrical bodies 71. A sheet member 8 made of a resin or paper is joined to the base sections 73.

The resin structure body 7 is sandwiched between the metal sheet of the intermediate section 4B in the high-rigidity region 410 and the sheet member 8, and thereby the overall thickness including the metal sheet of the intermediate section 4B in the high-rigidity region 410 can be increased. Also a weight reduction with respect to rigidity can be achieved by increasing the rigidity of the high-rigidity region 410 using a resin having a smaller density than the metal sheet.

The structure of the resin structure body 7 is not limited to the example shown in FIG. 5. For example, the height, and the size and the pitch in the in-plane direction of the cylindrical body 71, the shapes of the top surface 72 and the base section 73 (for example, a circle or a honeycomb structure), etc. may be set in accordance with performance required of the high-rigidity region 410 for which the resin structure body 7 is used, etc., as appropriate.

The resin structure body 7 may be joined to one surface or both surfaces of the metal sheet in the high-rigidity region 410. In the case where the resin structure body 7 is joined to one surface of the metal sheet, the resin structure body 7 may be joined to either of the inside and the outside of the vehicle. However, the resin structure body 7 is preferably joined to the inside of the vehicle in order to avoid a reduction of the effect of rigidity increase caused by damage due to collision of an object from the outside. It is also possible to employ a configuration in which the resin structure body 7 is joined to one surface of the metal sheet in the high-rigidity region 410, and the sheet member is joined to the other surface.

Further, a concave-convex shape may be formed on the metal sheet in the high-rigidity region 410. The concave-convex shape is, for example, a shape composed of a concave section or a convex section formed on a surface of the metal sheet. The proportion of flat surfaces (surfaces on which a concave-convex shape is not formed) in the high-rigidity region 410 is reduced by a concave-convex shape being formed on the metal sheet in the high-rigidity region 410. Thereby, the rigidity of the metal sheet in the high-rigidity region 410 is improved. The concave-convex shape may be formed by, for example, embossing or the like. More specifically, the concave-convex shape disclosed in WO 2013/94691 may be used as the concave-convex shape for the high-rigidity region 410.

The means for rigidity increase described above may be used in combination for the metal sheet in the high-rigidity region 410, as appropriate. For example, the concave-convex shape may be formed on the metal sheet in the high-rigidity region 410 by embossing, and the resin structure body and/or the sheet member may be joined to the metal sheet.

The means for rigidity increase described above are only examples, and known technologies for rigidity increase may be applied to the high-rigidity region as long as the rigidity in the high-rigidity region of the intermediate section 4B etc. can be improved.

Hereinabove, specific examples of rigidity increase are described.

<2.5. Specific Examples of Joint Section>

Next, specific examples of the joint section 6 according to the present embodiment are described.

Referring to FIG. 2 again, the joint section 6 joins together the inner side surface 22a of the side wall 22 of the framework member 2 and the outer side surface 42a of the side wall 42 of the gutter section 4A of the dash lower panel 3. The joint section 6 shown in FIG. 2 is only a schematically shown joint section; the position, range, and size of the actual joint section 6 are not limited to the example shown in FIG. 2, and vary in accordance with the joining manner.

For example, the joint section 6 shown in FIG. 2 may be a nugget that is formed between the side wall 22 and the side wall 42 by spot welding. In another example, the position (the position in the vehicle length direction or the vehicle height direction) where the joint section 6 is formed may be the whole or part of the portion where the inner side surface 22a of the side wall 22 and the outer side surface 42a of the side wall 42 are in contact with each other. The range of the joint section 6 may be a range in which one or both of the side wall 22 of the framework member 2 and the side wall 42 of the gutter section 4A are pierced, or may be a contact portion between the side wall 22 and the side wall 42 and its vicinity. The size of the joint section 6 may be set in accordance with the joining means, the position of formation, etc., as appropriate. A plurality of joint sections that join the inner side surface 22a of the side wall 22 and the outer side surface 42a of the side wall 42 together may be formed as one joint section 6.

The joint section 6 may be a weld, for example. That is, the joint section 6 may be a portion formed by welding. The welding is not limited to spot welding described above, and may be laser welding, arc welding, arc spot welding, or the like. The welding may also be hybrid welding in which laser welding and arc welding are combined.

The weld may be formed in a line continuing while winding in the vehicle length direction. FIG. 6 is a diagram showing an example of a weld 60 that is formed in a line continuing while winding in the vehicle length direction. As shown in FIG. 6, the weld 60 joining the side wall 22 of the framework member 2 and the side wall 42 of the gutter section 4A of the dash lower panel 3 together may be formed in a wavelike fashion so as to continue in the vehicle length direction and vibrate in the vehicle height direction. Thereby, a longer joint line length can be obtained. Therefore, the joint strength between the framework member 2 and the dash lower panel 3 can be increased.

The joint section 6 may also be, for example, a fastening section. The fastening section may be obtained by, for example, a bolt and a nut, a rivet, or the like. Thereby, the inner side surface 22a of the side wall 22 of the framework member 2 and the outer side surface 42a of the side wall 42 of the gutter section 4A are joined together by fastening. The joint section 6 may also be, for example, an adhesion section. The adhesion section may be obtained by, for example, a known adhesive or the like such as a resin. Thereby, the inner side surface 22a of the side wall 22 of the framework member 2 and the outer side surface 42a of the side wall 42 of the gutter section 4A are joined together by adhesion. The joint section 6 may also be, for example, a sticking joint section. The sticking joint section may be obtained by, for example, connecting together the inner side surface 22a of the side wall 22 of the framework member 2 and the outer side surface 42a of the side wall 42 of the gutter section 4A by plastic deformation in a state where both surfaces are kept in contact. The sticking joint section may also be obtained by sticking-joining using a joining member such as a rivet.

<2.6. Specific Examples of Other Reinforcing Means>
(Fitting Groove)

Next, examples in which the framework member 2 and the gutter section 4A of the vehicle front portion structure 1 according to the present embodiment are each provided with fitting grooves are described.

First, the side wall of a part of the gutter section 4A may be provided with one or a plurality of first fitting grooves extending in the vehicle height direction. In this case, a side wall of the framework member 2 is provided with a second fitting groove corresponding to the first fitting groove provided in the gutter section 4A. When the framework member 2 and the dash lower panel 3 are being joined together, the first fitting groove is fitted into the second fitting groove. These fitting grooves may be formed by, for example, providing a drawing mold with fitting grooves, or the like.

FIG. 7A is a side view showing a state of the framework member 2 and the gutter section 4A in the case where first fitting grooves 80 are fitted into second fitting grooves 81. FIG. 7B is a cross-sectional view showing a first example showing a state of the framework member 2 and the gutter section 4A in the case where first fitting grooves 80A are fitted into second fitting grooves 81A. FIG. 7B is a cross-sectional view perpendicular to the vehicle height direction of the framework member 2 and the gutter section 4A.

As shown in FIG. 7A and FIG. 7B, a part of the side wall 22 of the framework member 2 and a part of the side wall 42 of the gutter section 4A are each provided with a portion winding in the vehicle length direction. Of these portions, portions protruding to the outside of the side wall 22 and the side wall 42 are the first fitting groove 80A and the second fitting groove 81A. Since the first fitting groove 80A is fitted into the second fitting groove 81A, the inner side surface 22a of the side wall 22 of the framework member 2 and the outer side surface 42a of the side wall 42 of the gutter section 4A are in contact with each other also in the portion of the fitting groove.

In the case where the framework member 2 and the gutter section 4A are not provided with the fitting grooves, when a collision load acts on the dash lower panel 3 from the front side of the vehicle, load transfer from the dash lower panel 3 to the framework member 2 is performed only via a joint place such as the joint section 6 (6a, 6b, 6c). Consequently, when the transferred load is larger than the joint strength, breaking occurs in the joint section 6 between the framework member 2 and the dash lower panel 3, and the transfer of impact force to the inside of the vehicle and the entry of a colliding body or the like may occur. Thus, the framework member 2 and the gutter section 4A are provided with the fitting grooves, and the fitting grooves are fitted to each other; thereby, the collision load can be transferred from the dash lower panel 3 to the framework member 2 via the portions where the fitting grooves are in contact with each other. Therefore, the overall joint strength between the framework member 2 and the dash lower panel 3 can be increased. Thereby, collision safety can be improved.

Although the joint section 6 shown in FIG. 7A and FIG. 7B is provided in the outermost position of the first fitting groove 80A and the second fitting groove 81A, the position in the vehicle length direction where the joint section 6 is provided is not particularly limited as long as the fitting state of fitting grooves can be maintained. Further, separately from the joint section 6, for example, portions where the inclined wall 4 of the dash lower panel 3 and the flange 23 of the framework member 2 are in contact with each other and which are in an area where the first fitting groove 80A and the second fitting groove 81A are fitted to each other may be joined together.

Figure 7C:
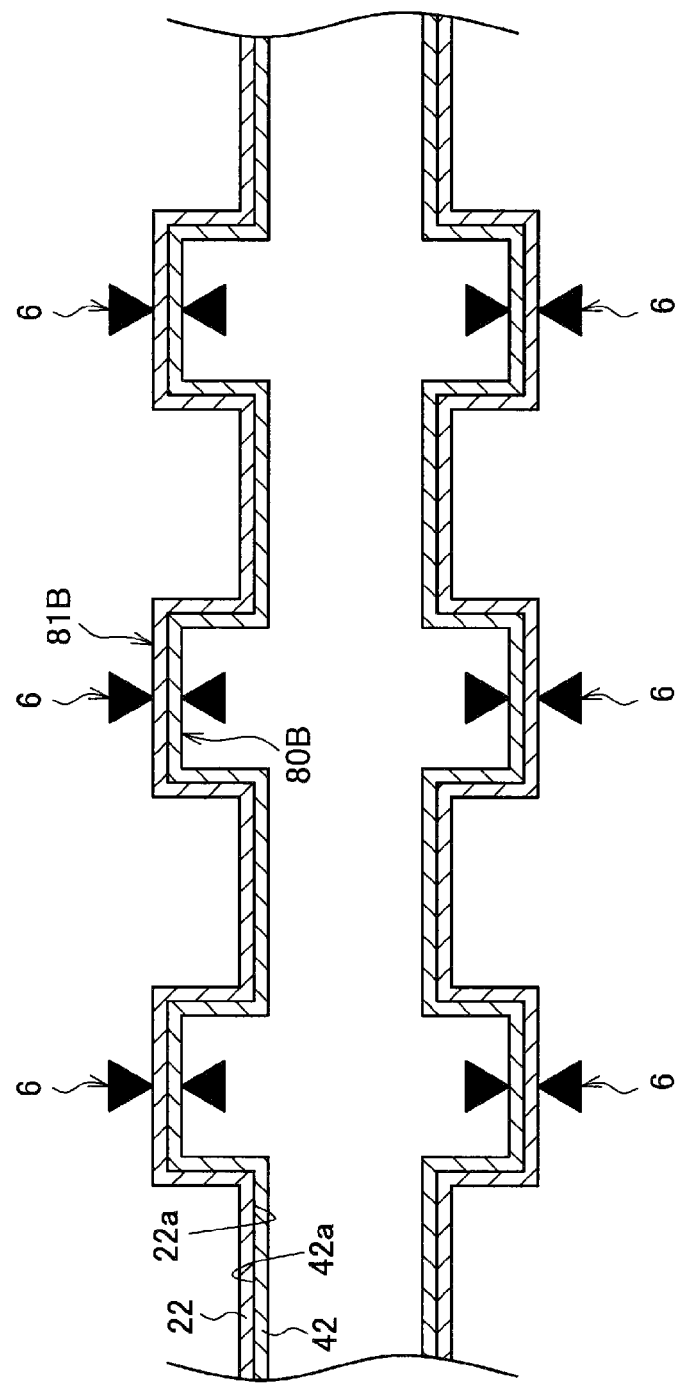
FIG. 7C is a cross-sectional view showing a second example showing a state of a framework member and a gutter section in a case where first fitting grooves are fitted into second fitting grooves.

The shape (cross-sectional shape) of the first fitting groove and the second fitting groove is not limited to the example shown in FIG. 7B. FIG. 7C is a cross-sectional view showing a second example showing a state of the framework member 2 and the gutter section 4A in the case where first fitting grooves 80B are fitted into second fitting grooves 81B. FIG. 7C is a cross-sectional view perpendicular to the vehicle height direction of the framework member 2 and the gutter section 4A. As shown in FIG. 7C, each of the first fitting groove 80B and the second fitting groove 81B may have a U-like cross-sectional shape in a planar view. The shapes (cross-sectional shapes) of the first fitting groove 80 and the second fitting groove 81 may not necessarily be the same or similar. The shape of the first fitting groove 80 and the second fitting groove 81 is not particularly limited as long as fitting grooves can be in contact with each other.

Although in the examples shown in FIG. 7A to FIG. 7C each of the first fitting groove and the second fitting groove has a shape in which the side wall of each of the framework member 2 and the gutter section 4A protrudes to the outside of this side wall, the present invention is not limited to the examples. For example, the side wall of each of the framework member 2 and the gutter section 4A may have portions protruding to the inside of this side wall, and each of the first fitting groove and the second fitting groove may be a fitting groove provided between adjacent ones of the protruding portions. Even in this configuration, the working of transfer of an impact load via the portions where the fitting grooves are in contact with each other is brought about, and the joint strength can be increased.

The length in the vehicle width direction of the first fitting groove and the second fitting groove (that is, the depth of the groove in the fitting groove) may be the same from the opening section to the bottom surface section of the framework member 2 and the gutter section 4A. The length in the vehicle width direction of each of the fitting grooves mentioned above may also change from the opening section mentioned above to the bottom surface section mentioned above. For example, in the case where each of the fitting grooves mentioned above protrudes to the outside of the side wall as shown in FIG. 7B and FIG. 7C, the length in the vehicle width direction of each of the fitting grooves mentioned above may decrease with transition from the opening section mentioned above to the bottom surface section mentioned above. This configuration is favorable in terms of moldability.

(Contact Member)

Next, examples in which a contact member is provided inside the gutter section 4A of the vehicle front portion structure 1 according to the present embodiment are described.

A contact member in contact with both facing side walls (that is, both facing inner side surfaces) of the gutter section 4A may be provided inside the gutter section 4A. That is, the contact member may be provided so as to link both side walls inside the gutter section 4A.

Figure 8A:
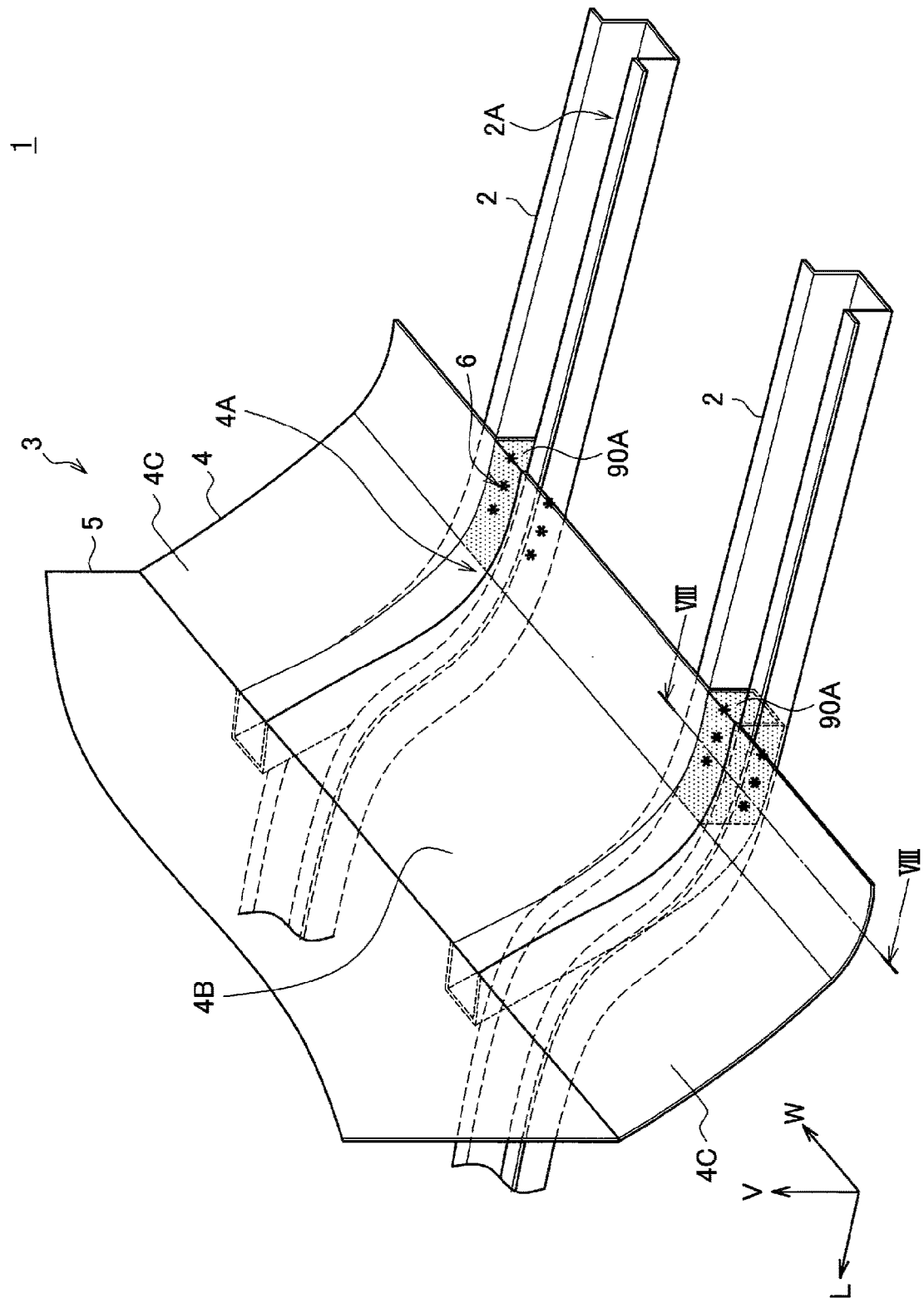
FIG. 8A is a perspective view showing a first example of a contact member and specifically showing a rough configuration of a vehicle front portion structure including a contact member.

FIG. 8A to FIG. 8C are diagrams showing a first example of the contact member. FIG. 8A is a perspective view showing a rough configuration of the vehicle front portion structure 1 including contact members 90A, FIG. 8B is a side view showing a rough configuration of the vehicle front portion structure 1 including the contact members 90A, and FIG. 8C is a cross-sectional view of the framework member 2 and the dash lower panel 3 in the vehicle front portion structure 1 including the contact members 90A. As shown in FIG. 8A to FIG. 8C, the contact member 90A may be provided so as to fill the space inside the gutter section 4A. In this case, the contact member 90A is provided in contact with the mutually facing side walls 42.

When the dash lower panel 3 receives a collision load, there is a likelihood that the side wall 22 and the side wall 42 will deform in a direction in which they move away from each other, due to the load. Specifically, there is a case where the side wall 42 of the gutter section 4A falls into the inside of the gutter section 4A due to the load. Consequently, breaking due to a peeling mode of the joint section 6 is likely to occur.

Thus, the contact member 90A is provided inside the gutter section 4A, and thereby the falling into the inside of the side wall 42 of the gutter section 4A can be suppressed. Hence, breaking due to the peeling mode of the joint section 6 can be prevented. Therefore, the joint strength between the framework member 2 and the dash lower panel 3 can be increased.

It is sufficient that the contact member be provided in contact with both facing side walls of the gutter section 4A. FIG. 8D is a diagram showing a second example of the contact member. As shown in FIG. 8D, a contact member 90B that links parts of the side walls 42 (in FIG. 8D, upper portions of the side walls 42) of the gutter section 4A in a cross-sectional view orthogonal to the vehicle length direction may be provided. Thereby, even when force whereby the side wall 42 falls into the inside of the gutter section 4A acts due to a collision load, the falling can be suppressed by the contact member 90B. The size and the contact position of the contact member inside the gutter section 4A in a cross-sectional view orthogonal to the vehicle length direction may be set in accordance with the required strength, rigidity, weight, production cost, etc. of the vehicle front portion structure 1, as appropriate.

The installation position of the contact member in the vehicle length direction is not particularly limited. However, in order to prevent breaking due to the peeling mode of the joint section 6 more reliably, it is preferable that the contact member be provided to correspond to the position where the joint section 6 (for example, the joint sections 6a, 6b, and 6c shown in FIG. 8B) is provided in the vehicle length direction. The installation position and the amount of installation of the contact member in the vehicle length direction may be set in accordance with the required strength, rigidity, weight, production cost, etc. of the vehicle front portion structure 1, as appropriate.

The contact member may be formed of, for example, a resin such as a foaming-hardening resin. The contact member may also be formed of, for example, a metal piece or a metal sheet. The contact member may not necessarily be fixed to the inner side surfaces of the side walls 42 of the gutter section 4A. That is, the contact member does not need to adhere to the inner side surfaces of the side walls 42, and may be stuck to at least parts of the inner side surfaces of the side walls 42.

3. Conclusion

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 vehicle front portion structure
2 framework member
3 dash lower panel
4 inclined wall
4A gutter section
4B intermediate section
4C outer sheet section
5 vertical wall
6 joint section
7 resin structure body
8 sheet member
21 bottom wall
22 side wall
23 flange
41 bottom wall
42 side wall
71 cylindrical body
72 top surface
73 base section
80A, 80B first fitting groove
81A, 81B second fitting groove
90A, 90B contact member
410 high-rigidity region

The invention claimed is:

1. A vehicle front portion structure comprising:
a framework member in a gutter shape provided in a vehicle length direction from a front box to a cabin and having a side wall; and
a dash lower panel that includes a gutter section having a side wall and fitted into an inside of the framework member and in which the side wall of the gutter section and the side wall of the framework member are joined together,
wherein at least a part of the side wall of the gutter section is provided with a first fitting groove extending in a vehicle height direction,
the side wall of the framework member is provided with a second fitting groove corresponding to the first fitting groove, and
the first fitting groove is fitted into the second fitting groove.

2. A vehicle front portion structure comprising:
a framework member in a gutter shape provided in a vehicle length direction from a front box to a cabin and having a side wall; and
a dash lower panel that includes a gutter section having a side wall and fitted into an inside of the framework member and in which the side wall of the gutter section and the side wall of the framework member are joined together,
wherein a contact member in contact with the side walls that mutually face each other of the gutter section is provided inside the gutter section.

3. The vehicle front portion structure according to claim 2,
wherein the contact member is formed of a resin or a metal.

4. A vehicle front portion structure comprising:
a framework member in a gutter shape provided in a vehicle length direction from a front box to a cabin and having a side wall; and
a dash lower panel that includes a gutter section having a side wall and fitted into an inside of the framework member and in which the side wall of the gutter section and the side wall of the framework member are joined together,
wherein a pair of the gutter sections are provided side by side in a vehicle width direction in the dash lower panel, and
in an intermediate section located between the pair of gutter sections in the dash lower panel, a high-rigidity region having a rigidity higher than a rigidity of a portion on an outside in the vehicle width direction of the intermediate section in the dash lower panel is provided from one end to another end in the vehicle width direction of the intermediate section.

5. The vehicle front portion structure according to claim 4,
wherein a sheet thickness of a metal sheet in the high-rigidity region is larger than a sheet thickness of the metal sheet in a portion other than the high-rigidity region in the dash lower panel.

6. The vehicle front portion structure according to claim 4,
wherein a sheet member made of a resin is joined to a metal sheet in the high-rigidity region.

7. The vehicle front portion structure according to claim 4,
wherein a resin structure body including a plurality of cylindrical bodies of a same height, a top surface covering one end portion of each of the cylindrical bodies, and a base section connecting other end portions of adjacent ones of the cylindrical bodies is joined to a metal sheet in the high-rigidity region via the top surfaces, and
a sheet member made of a resin or paper is joined to the base sections of the resin structure body.

8. The vehicle front portion structure according to claim 4,
wherein a metal sheet in the high-rigidity region has a concave-convex shape.

9. A vehicle front portion structure comprising:
a framework member in a gutter shape provided in a vehicle length direction from a front box to a cabin and having a side wall; and
a dash lower panel that includes a gutter section having a side wall and fitted into an inside of the framework member and in which the side wall of the gutter section and the side wall of the framework member are joined together,
wherein a pair of the gutter sections are provided side by side in a vehicle width direction in the dash lower panel, and
in an intermediate section located between the pair of gutter sections in the dash lower panel, a high-strength region having a tensile strength higher than a tensile strength of a portion on an outside in the vehicle width direction of the intermediate section in the dash lower panel is provided from one end to another end in the vehicle width direction of the intermediate section.

* * * * *